Patented Aug. 7, 1951

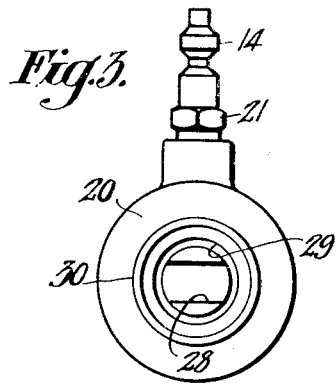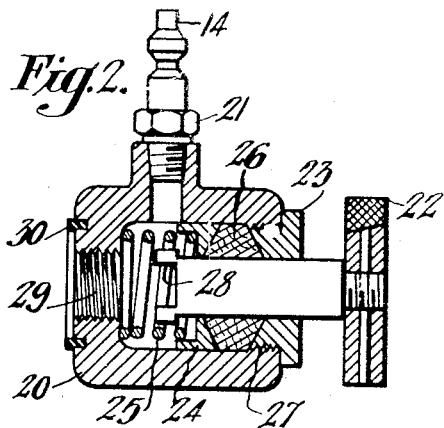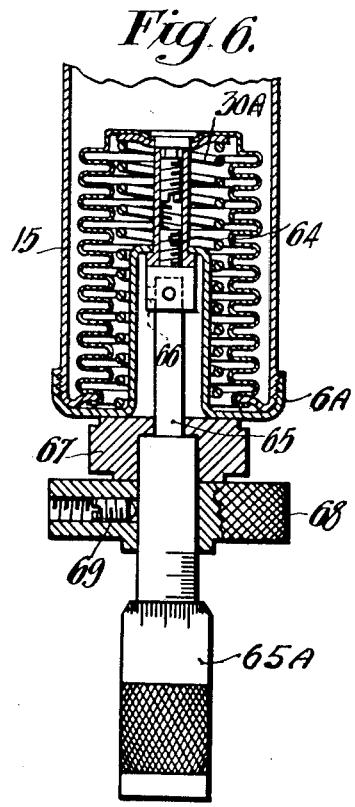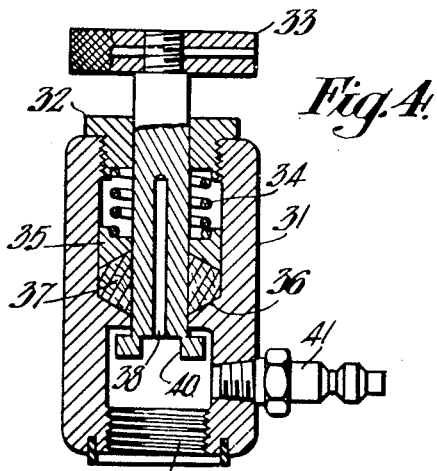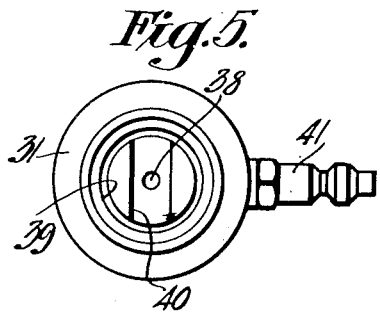

2,562,972

UNITED STATES PATENT OFFICE 2,562,972

METHOD AND APPARATUS FOR PURIFYING AND TESTING A FLUID DIELECTRIC AND FILLING A CONTAINER OR AN ELECTRICAL CAPACITOR THEREWITH

Sidney Wald, Philadelphia, Pa., assignor to Radio Corporation of America, a corporation of Delaware Application November 14, 1944, Serial No. 563,430

2 Claims. (Cl. 226—69)

This invention relates to a new and useful method of producing a high grade fluid electrical dielectric.

An object of this invention is to provide a simple and efficient means to produce a novel fluid dielectric which is adapted for electrical capacitors.

Another object of this invention is to provide a means for testing and filtering a fluid dielectric, and also means for filling an electric capacitor with the fluid after it has been produced.

A feature of this invention is an improved system which processes the fluid dielectric by a filtering apparatus which removes the solids (such as lint, fibers and colloidal particles), removes moisture (such as colloidal and dissolved water), and eliminates dissolved gases including air and $CO_2$.

It has been found desirable to utilize oil as an electrical dielectric for high power variable capacitors. The ordinary capacitor dielectric of petroleum oils about doubles the capacity of a capacitor. Electrical capacitors with oil as a dielectric are very well suited for power capacitors, because the breakdown voltage is very high, dielectric and brush losses low, and on account of the high dielectric constant of some oils, it is easy to get a large electrical capacity in moderate physical volume.

While this statement is true under certain conditions, the rigors of most practical capacitor applications have in the past seriously limited the practical applications of variable capacitors with liquid dielectrics. Questions of operating frequency, temperature range, losses and maintenance have in general remained indefinite in the prior art, and a host of misconceptions as to the electrical properties of various liquid insulators have become the basis of much skepticism as to their practicability and utility in radio frequency capacitors.

There are several fields of electrical engineering wherein the use of petroleum oils have been developed to a high level. The use, for example, of oil in circuit breakers, switches, insulating bushings, transformers and high voltage cables has been thoroughly discussed in the prior art. However, all of the past applications are limited in operating frequency to several hundred cycles. Moreover the oil in many cases has been used as a cooling medium, for example, in power transformers or an arc quenching medium in applications of circuit breakers and switches. On some applications of power engineering, oils are used in high voltage underground cables to reinforce the insulating properties of paper as a dielectric, and to increase the breakdown potential of the cable. Examples have been cited wherein oil-filled cables are being operated at voltages up to 130 kv. In all of these low frequency power applications, electrical permittivity has been unimportant except as the lower values would be more desirable to reduce the displacement current.

In the present electronics field various dielectric liquids are used as saturants and fillers for low frequency paper capacitors. Three types of liquids are in general use, such as, for example, mineral oil, castor oil, chlorinated diphenyl compounds like those sold under the trade names as "Dykanol," "Pyranol," "Inerteen," etc.

These capacitors have not been used or recommended for use in critical radio tuning applications or at radio frequencies. They are generally used as low frequency by-pass and buffer capacitors where the principal requirements are high capacity and high dielectric strength. For example, castor oil filled capacitors may lose as much as 20 percent of their capacity when the temperature drops to —50° centigrade. Chlorinated diphenyl capacitors suffer a loss of capacity at low temperatures.

Neither castor oil nor the chlorinated compounds are suitable for exacting or critical applications due to their rapid change of electrical and physical constants with temperature and frequency. Oil-filled paper capacitors are not generally self-healing, that is, the first flash-over destroys the unit.

Variable air capacitors for radio frequency resonant circuits have been the accepted standard of excellence up to and including the present state of the art. Some of the more familiar advantages of the air capacitors are:

a. Stability of capacity with changes in temperature, pressure, humidity, composition of air, frequency and applied voltage, b. Extremely low power loss or very high Q (over 10,000). The power loss of an air capacitor is not due to the loss in the air dielectric but to the parts involved in mechanical construction, such as plates, supports of solid insulation and terminals.

c. Low cost and ease of fabrication.

d. Self-healing after breakdown.

e. Low capacity for a given size.

f. Relatively low breakdown voltage gradient. (For large spacings, approximately 31 kv. (max.) per centimeter at sea level. This reduces to about 6 kv. per centimeter at 40,000 feet of altitude at room temperature.)

For small but high radio frequency apparatus (such as, for example, airborne communication transmitters), variable tuning capacitors of the type disclosed in my patent application Serial No. 559,621, filed October 20, 1944, now abandoned, are required in the frequency range of 1 to 20 megacycles. These units must be small in physical size and weight, have relatively high capacity and withstand high R. F. voltages at altitude up to 50,000 feet. Capacitors with only air dielectric become extremely large and heavy for aircraft application. It is, of course, commercially feasible to construct high pressure variable air capacitors to withstand high voltage, but these units are bulky and again have a very poor capacity to the physical size ratio. Generally, compressed gas capacitors also require intermittent pumping to maintain the required pressure.

Inasmuch as a liquid dielectric possesses the desirable electrical characteristics of high capacity per unit size, together with high dielectric strength for short gaps or plate spacing, they are a good solution to the aircraft capacitor problem.

In order for variable tuning capacitors to function properly in modern high altitude aircraft, they must be capable of maintaining constant capacity, low loss, high dielectric strength, and long life under the following conditions:

1. Temperature range of −55° C. to +85° C.
2. External barometric pressure from sea level to that existing at 50,000 feet altitude.
3. Humidity variations up to temporary immersion in salt water.
4. Frequency range from 1 to 10 mc. (for present requirements).
5. Capacity up to 600 micro-microfarads.
6. High current carrying ability (up to 20 amps. at root mean square).

There are many known liquid dielectrics capable of fulfilling a few of these conditions, but usually they are deficient in one or more of the remaining requirements. In terms of physical properties of liquids, the frequency requirements call for a freezing or pour point well below −50° C. and low vapor pressure at +85° C.

The liquid should be non-inflammable or possibly no more dangerous to handle than ordinary kerosene. The flash point should not be under 100° F. Finally, the material should be non-toxic and capable of being maintained at elevated temperatures for long periods of time in a hermetically sealed enclosure.

In order to understand why some materials are more suitable than others as insulators, a brief summary of the theory of dielectric polarization will be discussed. Polarization is the response of the charge carriers in a dielectric to an applied electric field. These carriers may be thought of as the negative electron cloud which compensates for the positive charge of the nucleus.

The external electric field induces dipole moments in the dielectric medium. The atoms of a perfect insulator yield no free charges in the presence of an electric field, but it is believed that they are electrically stretched or polarized to a degree depending on the intensity. Since this induction takes place instantaneously, no acceleration of mass is involved and consequently there is no lag between the applied field and the resulting induction. Thus no resonances appear in the dielectric up through the optical range of frequencies. At radio frequencies this type of polarization results in a very small power loss. The dielectric constant or permittivity due to induced dipoles is independent of the frequency.

For example, if a molecule is so constructed that the center of gravity of the positive charge does not coincide with the center of gravity of the negative charge even with no external field applied, the molecule is a permanent dipole. In this case, application of an external field causes mechanical displacement or rotation of molecules, depending on both the intensity and frequency of the field. Gaseous molecules follow the field instantaneously with no resonance occurring until we reach infra-red frequencies. Heavier molecules may resonate in the microwave range. Solids and liquids have the heaviest molecules, and besides having resonance in the radio frequency range, friction may be very high, causing the resonance effect to be very broad. The loss goes up to a maximum at resonance and decreases as the permanent dipole effect is left behind. The effect of frequency on this type of polarization is that with increasing frequency the molecules lag more and more and their contribution to the permittivity decreases gradually.

Since thermal action tends to destroy or at least decrease the alignment with the applied field, it is to be expected that an increase of temperature will decrease the contribution to the total permittivity of the polar molecules. Conversely, at extremely low temperatures the reduction in thermal agitation results in increasing permittivity.

As far as losses are concerned, when this type of polarization is present, decreasing viscosity causes resonance to occur at a higher frequency, and so the loss at a given frequency will usually decrease with increasing temperatures. Of course, due to decreasing resistivity at high temperatures the loss tends to rise, and it is the resultant of these effects which are actually observed.

Space-charge polarization is characterized by migration of charge carriers under influence of the applied field. Since the resistivity of the fluids under consideration is of the order of $20 \times 10^{12}$ ohms per cm. cube at 40° C., this type of polarization may be disregarded here.

From the preceding theoretical discussion it can be seen that the most desirable fluids would be those with low permanent dipole moment and high permittivity (large induced dipole polarization). This combination would yield a liquid having little temperature sensitivity and good dielectric constant with low power factor over a wide frequency range. Additional requirements are, of course, low freezing point, low coefficient of volumetric expansion, high boiling point, and negligible reaction with the shaft seal in the hermetically sealed container.

The most common group of substances meeting the above requirements and which are liquid at ordinary temperatures are the petroleum hydrocarbons. These liquids are of two distinct origins. One group is derived from naphthenic crude petroleum, the other from paraffin crudes. In general, the pour point (low temperature solidification) of the naphthenic distillates is much lower than that of the paraffin base distillates. Consequently, other things being equal, it is more desirable to utilize the former for low temperature work as a capacitor dielectric.

Petroleum distillates have the additional advantage of being composed principally of mixtures of saturated hydrocarbons, few double bond carbon atoms being available to take on oxygen or other elements. Prolonged heating at about 100° C. in contact with air will cause the liquid to oxidize slowly. In order to prevent all oxidation and deterioration the liquid must completely fill a hermetically sealed container with no exposure to atmospheric oxygen.

The ordinary commercial petroleum hydrocarbon liquids to be processed and produced for use as a capacitor dielectric must first be purified by a process developed by this invention to make them very useful as electrical capacitor dielectric liquids, as will be explained by the accompanying drawings in which:

Fig. 2 is a cross sectional view of the capacitor inlet filling fixture.

Fig. 3 is a bottom view of Fig. 2.

Fig. 4 is a cross sectional view of the capacitor top outlet filling fixture.

Fig. 5 is a bottom view of Fig. 4; and

Fig. 6 is a sectional view of the bellows spring compression tool used while filling the capacitor.

Figure 1:
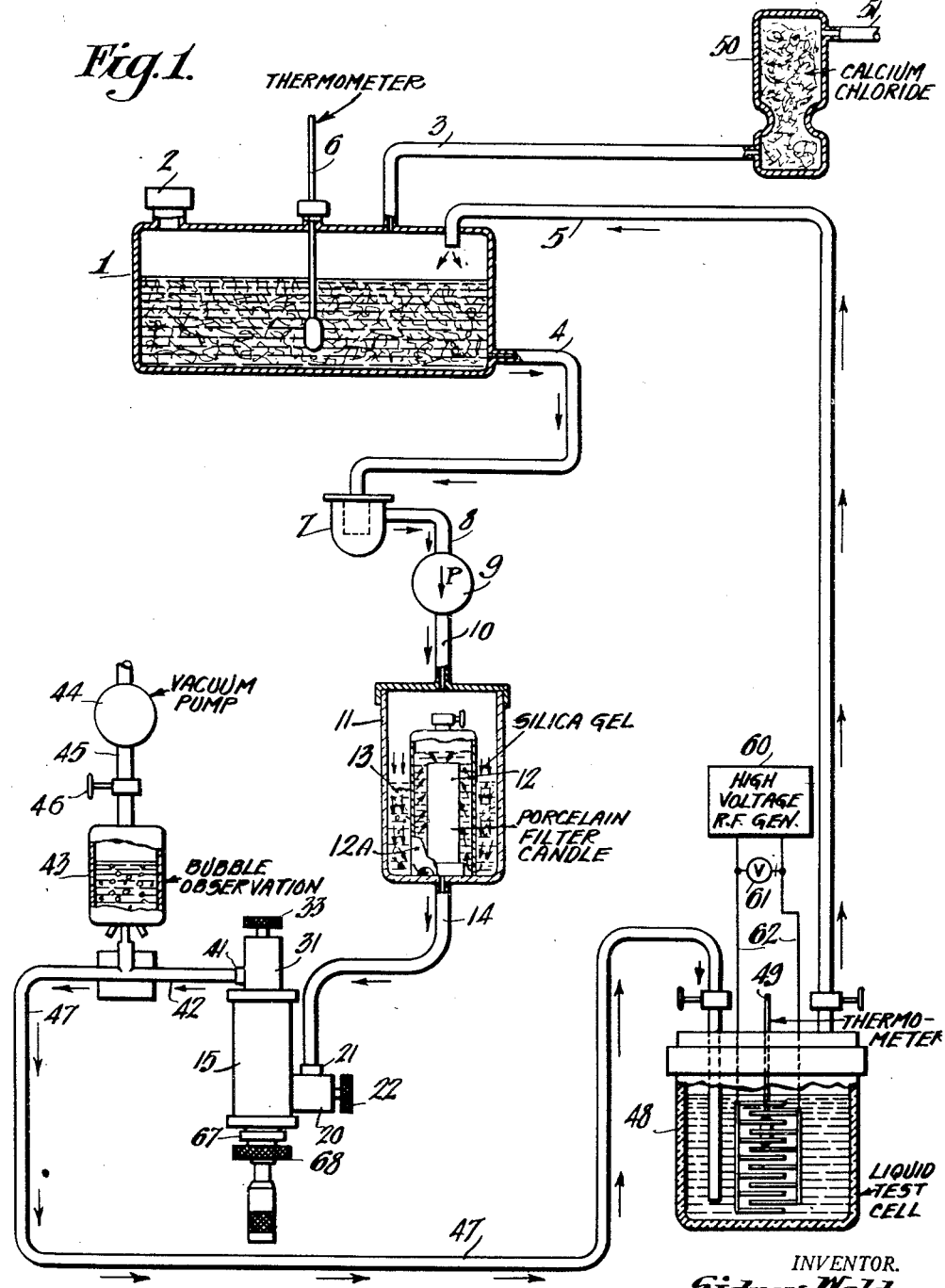
Fig. 1 is a diagram of the system of this invention.

Referring now in detail to Fig. 1 of the drawing, the filtering apparatus of the commercial impure liquid includes a tank or reservoir 1 having a filling cap 2, a vent 3, an outlet flow pipe 4 and a return pipe 5. A thermometer 6 is inserted in the storage tank to accurately determine the temperature and then maintain it within a desired range by any suitable means (not shown). The flow of the liquid to be processed is indicated by the direction shown by the arrows, which flows from outlet pipe 4 to a pump filter 7 which filters the larger and more solid impurities. The outlet of filter 7 connects by a pipe 8 to the inlet of a motor driven pump 9 which furnishes sufficient pressure to force the liquid through the system. The outlet from the motor driven pump 9 is connected by a pipe 10 to a purification chamber 11 which consists of one or more #01 Selas micro-porous filter candles 12 treated so as to render the porcelain water repellent. An inverted siphon 12A covers the entire exposed portion of the filter candle. A normally closed syphon filling valve is located in the top portion of the syphon 12A. A plurality of semicircular apertures are located in the bottom portion of syphon 12A. Surrounding the outside portion of syphon 12A is a layer of silica gel 13. The commercial liquid trickling through activated silica gel is freed of moisture by the absorbent action of the gel. The inverted siphon causes the partly purified liquid to be drawn through the semicircular apertures in syphon 12A and then into the inner section next to the porcelain filter candle 12 which is completely immersed in the liquid at all times by ordinary syphon action. The pressure is transmitted through the semicircular apertures in syphon 12A to the surface of the purification flask 11, and is limited to 4 pounds per square inch to force the fluid through the porcelain. Other pressures may be employed depending, of course, upon the porosity of the filter 12. The resulting filtrate, free of moisture and all particles, passes through the porous porcelain (having a pore diameter of the order of 10 microns) and down into the capacitor 15 of my patent application, Serial No. 559,621, filed October 20, 1944, now abandoned. The interior of the capacitor is the only portion of the set-up that must have been carefully cleaned before starting. The remaining portions of the apparatus may be handled without extraordinary precautions.

The cleaning of the capacitor, capacitor case and filter flask is a separate problem which is solved in the following practical manner. It should be pointed out that the most careful filtration and purification of the liquid is useless if the casing and capacitor are not themselves cleaned to the same degree. According to this invention, there are several distinct steps which must be taken in this cleaning sequence:

1. Removal of substances soluble in alcohol or acetone (such as rosin from soldered joints).
2. Removal of oily films due to handling.
3. Removal of fine dust particles and residual foreign matter.

These steps are accomplished as follows:

A. Blow out capacitor and casing with clean and dry compressed air at about 20 pounds per square inch.

B. Wash capacitor and casing in alcohol or acetone—air dry.

C. Wash capacitor and casing in clean petroleum ether—air dry.

D. Agitate with hot solution of sodium alkyl sulphonate and water. This is a soapless detergent cleaner which acts by reducing surface tension and permits the water to carry off lint and fibers and dust.

E. Rinse thoroughly with hot distilled water to remove all traces of detergent.

F. Dry in clean oven at 110° C. Air circulating in oven must be dust-free and dried through calcium chloride.

G. Cool to room temperature in vacuum desicator. Capacitor assembly must be inserted in the process circuit and filled as quickly as possible after removal from desiccator to prevent contamination. A continuous process involving a minimum of handling and contamination is very desirable in production.

The pipe 14 connects with the fluid inlet filling fixture or inlet value shown by Figs. 2 and 3, which fixture or valve comprises a housing 20, a pipe coupling 21, a control knob 22, a gland packing nut 23, a gland packing seat 24, a spring 25, and a packing member 26 which is interposed between the gland nut 23 and seat 24. The right side or body portion of the housing 20 is threaded at 27 to receive the gland nut 23. The spindle portion of control knob 22 is slotted at the left side portion thereof, at 28, to engage the flat sides of a filling cap (not shown) of a fluid dielectric type of capacitor 15 having spring loaded metallic bellows and having a side inlet and an end fluid outlet member secured to the capacitor casing. The bellows portion of such a capacitor is shown by Fig. 6. The lower portion of the housing 20 is threaded at 29 to engage the threads of the side inlet fluid member of capacitor 15. A gasket 30 is provided to prevent the entry of air or moisture in the fluid line of the filtering system of this invention. The end or control portion (not shown) of capacitor 15 is provided with an outlet valve or top filling fixture 31, as shown in Figs. 4 and 5 in the drawing, and comprises a gland nut 32, a control knob 33, a spring 34, a spring seat 35, a packing seat 36, and gland packing 37 which is interposed between the spring seat 35 and seat 36. It is to be noted that there is a difference in the location of spring 34 in the outlet filling fixture or outlet valve and the spring 25 of the inlet fixture. This difference in location is necessary in order to provide for suitable positive pressure at the inlet fixture and negative pressure (i. e.: vacuum) in the outlet or top portion of the capacitor 15. A long cylindrical aperture 38 is provided in the shaft of the control knob 33 to accommodate the shaft of the above mentioned capacitor 15. The lower end of housing 31 is threaded at 39 to engage the threads of the fluid outlet member of capacitor 15. The extreme end of the control knob shaft 33 is slotted at 40 to engage the flattened portion of the gland seal nut (not shown) of capacitor 15.

Before the capacitor 15 (shown by Fig. 6) is filled, it is necessary to preload the spring 30A at a predetermined setting which is determined by the room temperature at which the capacitor is to be filled. This preloading of the spring is accomplished by a bellows spring compression tool shown by Fig. 6, which device comprises a threaded engaging stud 64 which is threaded to engage the threads in the hollow stud of the above mentioned capacitor. The threaded stud 64 is fastened to the end of a shaft 65 of an ordinary machinist micrometer head 65A, and the shaft 65 is secured to the stud 64 by means of a set screw 66. A stationary thrust collar 67 is provided for placing over and protecting the end cap 6A. A handwheel 68 surrounds the spindle of the micrometer and is knurled to rotate the micrometer spindle to move shaft 65 laterally to compress the spring 30A and the associated bellows the desired amount. A set screw 69 locates handwheel 68 in the desired position on the micrometer spindle, which position is predetermined by the room temperature, for a given setting of the handwheel 68 on the micrometer with respect to the distance between the end cap 6A and the far end of spring 30A.

A fluid outlet connection 41 connects with a pipe 42, as shown in Fig. 1 of the drawings. At a junction point, a transparent chamber 43 is provided in order to degas the fluid in the capacitor after the latter has been filled with the fluid dielectric by circulation through the filter. The chamber 43 is connected to a vacuum pump 44 by means of a pipe 45 and valve 46. The opening of valve 46 will draw out any gas remaining in the system. Through the transparent chamber 43 the gas bubbles in the circulating fluid may be observed when valve 46 is opened. When the gas is all excluded from the system, valve 46 is closed. From the junction of pipe 42, a pipe 47 is connected and terminates in a fluid test cell 48. The test cell 48 is provided in order to arrive at a proper standard of the desired dielectric constant and losses of the filtered liquid dielectric. With this standard test cell it is necessary to utilize the same liquid passing through capacitor 15 as a dielectric in a parallel plate air capacitor, whose electrical characteristics are known. In this case the standard used comprises a variable capacitor having brass plates, silver plated, with a double end bearing having a dry electrical capacity of approximately 106 mmfd. and 0.025 to 0.030 inch spacing. This test capacitor was installed in a pint-size glass Mason jar fitted with Mycalex lid and neoprene lid gasket to keep the system fluid tight. Besides the capacitor terminal studs, the lid contains a neoprene bushed hole for a standard thermometer. From the test cell 48, the fluid then returns to the reservoir 1 through the pipe line 5. In order to provide a dry air vent in the space above the fluid within tank 1, a storage tank 50 is connected with pipe 3. Tank 50 serves as a drier for the air in the system and has contained therein a quantity of calcium chloride through which the air passes in or out through a tank vent 51.

The test capacitor 48 has connected across its plates, a high voltage generator 60 and a voltmeter 61 by the wires 62.

The test steps performed on the liquid in the test cell 48 are as follows:

1. Spark-over voltage at approximately 2000 kc. vs. temperature at constant pressure. Make a comparison of 60 cycle and R.-F. values.

Determine Q vs. frequency at room temperature.

Determine Q vs. temperature at limit frequencies 2 and 9 mc.

The Q for a capacitor of this invention is the reciprocal of the cosine of the phase angle and may be used as a figure of merit as far as power loss is concerned.

Determine dielectric constant vs. temperature.
Determine dielectric constant vs. frequency.

When properly tested and processed, all fluids produced by the method of this invention are able to withstand 7,500 volts (peak) at 2,500 kc. This measurement is made with an air dielectric plate type capacitor having a gap between plates of 0.025 to 0.030 inches at an ambient temperature of 25° C. Repeated flashovers, when voltages in excess of 7,500 are applied, cause no damage if severe arcing is not permitted to take place. Thus if the circuit is protected by a limiting device, the capacitor may withstand an indefinite number of individual breakdowns without permanent injury.

After the capacitor 15 is filled and before placing it in service, the control knob 22 on the inlet valve is rotated to close the filling cap of capacitor 15. The control knob 33 on the outlet valve is turned to close and seal the entire capacitor unit by turning the gland seal nut of capacitor 15. The inlet and outlet fixture are then removed from the outside casing of capacitor 15. It is thus clear that the inlet and outlet fixtures not only act as holding devices for maintaining the capacitor to be filled firmly in position in the system but they also direct and control, with valve action, the flow of dielectric into and out of the capacitor. Next the bellows compression tool is removed by rotation of handwheel 68, and the spring 30A will then act independently to take up only slight variation in temperature difference in the liquid by moving bellows 24 in or out. The capacitor is then ready for use.

It is found that liquids which have not had all moisture removed suffer a reduction in dielectric strength below a temperature of 0° C. A small amount of moisture in the liquid will cause sparkover at 4,000 volts in the above gap. Moisture has very little effect from 0° C. to +85° C. Liquids which have been processed by this invention do not suffer appreciable loss in breakdown strength below freezing temperatures.

Due to the number of variable factors involved in the processing and handling of dielectric fluids it is desirable to have the actual working voltage of the capacitor far below the ultimate strength of the dielectric. It is intended to operate a capacitor with 0.025 of 0.030 to an inch spacing between plates at 2,500 peak volts. This gives a factor of safety of about 3 to insure reliability under any condition of operation.

The selection of any one commercial petroleum hydrocarbon liquid for a given application will in general be a compromise choice, depending upon the particular application. Commercial Gulf "HS" fluid represents a compromise choice for aircraft capacitor applications. However, this invention should not be limited to the precise type of fluid disclosed as it is capable of being applied to many fluids.

The inlet and outlet filled fixtures may be adapted to fill other devices than that of the variable air capacitor disclosed in my patent application Serial No. 559,621, filed October 20, 1944, now abandoned. Also the fluid dielectric produced by this process has many other valuable uses. Therefore, the invention should not be limited thereto.

I claim:

1. The method of filling an electrical capacitor with an insulating fluid, said capacitor being of the type having a preloading spring and a movable end portion for compensating for changes in atmospheric temperature, comprising inserting the capacitor, a filler and a test cell in a closed fluid system, adjusting said preloading spring, circulating a fluid dielectric through said system and capacitor while removing impurities therefrom and continuously testing the same as it is circulated, continuing said circulation, purification and testing until said dielectric strength reaches a predetermined value and then sealing off said system from said capacitor and thereafterwards removing said filled capacitor from the system.

2. A closed circulating system for filling a container with a fluid dielectric having a predetermined degree of purity comprising a series of conduits, holding devices forming parts of said system connected to said conduits for removably holding the said container in said system, said holding devices including valve elements for controlling the flow of said fluid dielectric, a pump within said system for circulating said fluid dielectric through said system, a filter in the system for removing impurities from said dielectric, the said system also including a testing device for continuously testing the dielectric strength of said dielectric, said valve elements being manually operated to cut off the circulation of said dielectric when the dielectric strength thereof reaches a predetermined value thereby sealing off said system from said container.

SIDNEY WALD.

REFERENCES CITED

The following references are of record in the file of this patent:

UNITED STATES PATENTS

| Number | Name | Date |
|---|---|---|
| 248,209 | Patterson | Oct. 11, 1881 |
| 343,083 | Smith | June 1, 1886 |
| 364,936 | Hyatt | June 14, 1887 |
| 388,017 | Brownlow | Aug. 21, 1888 |
| 624,777 | Fausek | May 9, 1899 |
| 888,259 | Pauthonier | May 19, 1908 |
| 917,018 | Dempster | Apr. 6, 1909 |
| 1,447,096 | Martin | Feb. 27, 1923 |
| 1,778,910 | Niven | Oct. 21, 1930 |
| 1,866,659 | Litle | July 12, 1932 |
| 2,065,927 | Scott et al. | Dec. 29, 1936 |
| 2,095,470 | Foley | Oct. 12, 1937 |
| 2,123,434 | Paulson et al. | July 12, 1938 |
| 2,196,299 | Glunz | Apr. 9, 1940 |
| 2,216,902 | Bostelmann | Oct. 8, 1940 |
| 2,302,240 | Michaud | Nov. 17, 1942 |
| 2,328,131 | Eisler | Aug. 31, 1943 |
| 2,342,723 | Buttner et al. | Feb. 29, 1944 |
| 2,349,992 | Schrader | May 30, 1944 |
| 2,356,890 | Schulze | Aug. 29, 1944 |
| 2,381,354 | Larson | Aug. 7, 1945 |
| 2,383,065 | Lehman | Aug. 21, 1945 |
| 2,386,506 | Pumphrey | Oct. 9, 1945 |
| 2,399,192 | Alexander | Apr. 30, 1946 |

FOREIGN PATENTS

| Number | Country | Date |
|---|---|---|
| 427,926 | Germany | June 18, 1925 |
| 416,308 | Great Britain | Dec. 5, 1932 |

---

Certificate of Correction

Patent No. 2,562,972　　　　　　　　　　　　　　　　August 7, 1951

SIDNEY WALD

It is hereby certified that error appears in the printed specification of the above numbered patent requiring correction as follows:

Column 8, line 61, for "0.025 of 0.030 to" read *0.025 to 0.030 of*;

and that the said Letters Patent should be read as corrected above, so that the same may conform to the record of the case in the Patent Office.

Signed and sealed this 30th day of October, A. D. 1951.

[SEAL]

THOMAS F. MURPHY,
*Assistant Commissioner of Patents.*